United States Patent [19]
Bejnar et al.

[11] Patent Number: 5,484,998
[45] Date of Patent: Jan. 16, 1996

[54] BAR-CODED CARD WITH CODING AND READING SYSTEM

[75] Inventors: Jan W. Bejnar; Theodore E. Liebman, both of Philadelphia; Robert H. Levitt, Huntingdon Valley, all of Pa.

[73] Assignee: Decora Industries, Inc., Philadelphia, Pa.

[21] Appl. No.: 213,635

[22] Filed: Mar. 16, 1994

[51] Int. Cl.$^6$ .................................................. G06K 19/06
[52] U.S. Cl. ............................................ 235/494; 235/462
[58] Field of Search .................................... 235/494, 462, 235/463, 472, 482

[56] References Cited

U.S. PATENT DOCUMENTS

| | | | |
|---|---|---|---|
| 4,254,441 | 3/1981 | Fischer | 360/88 |
| 4,882,475 | 11/1989 | Miller | 235/383 |
| 5,140,145 | 8/1992 | Bianco | 235/462 |
| 5,276,316 | 1/1994 | Blamford | 235/462 |
| 5,331,141 | 7/1994 | Kaneko | 235/462 |
| 5,345,090 | 9/1994 | Hludzinski | 250/566 |

FOREIGN PATENT DOCUMENTS 60-108979  6/1985  Japan ..................... 235/462

OTHER PUBLICATIONS

Allais "Bar Code Symbology, Some Observations on Theory and Practice" pp. 3 & 4, Feb. 12, 1982.
"Symbologies" pp. 15-59.

Primary Examiner—Donald T. Hajec
Assistant Examiner—Karl D. Frech
Attorney, Agent, or Firm—Gregory J. Gore

[57] ABSTRACT

A bar-coding system employs a unique bar code pattern which includes a code represented by a series of dark and light stripes that may be easily decoded by a very inexpensive reader with greater reliability. The bar-coding system generates binary data from the pattern which may be described in parts as follows: long light fields at each left and right end; a start bar at each end; right and left data fields; and a three-bit asymmetric pattern (light, dark, light) in the center that indicates the direction in which the pattern is moving past the read head. The coding sequence of the data fields is arranged from either end toward the middle of the pattern where the coding method reverses; therefore, a coupon or card passed through the reader in either direction will yield the same output. Only two widths of the light and dark stripes are used, and the stripes are read as pairs in succession. A reader includes a card slot which is shaped to an arcuate path which bends an inserted card made from a resilient material so that the card is pressed against the slot sidewall to enhance the reader's accuracy and reliability.

14 Claims, 4 Drawing Sheets

Fig. 1
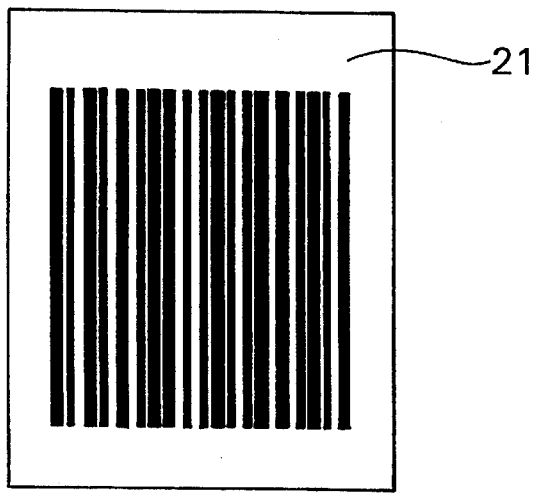
Fig. 2
code using wide-narrow for one and narrow-wide for zero
White A is wide than White C = 1     White A is narrower than White C = 0
Dark B is narrower than Dark D = 0   Dark B is narrower than Dark D = 0 code using wide-narrow for one and narrow for zero

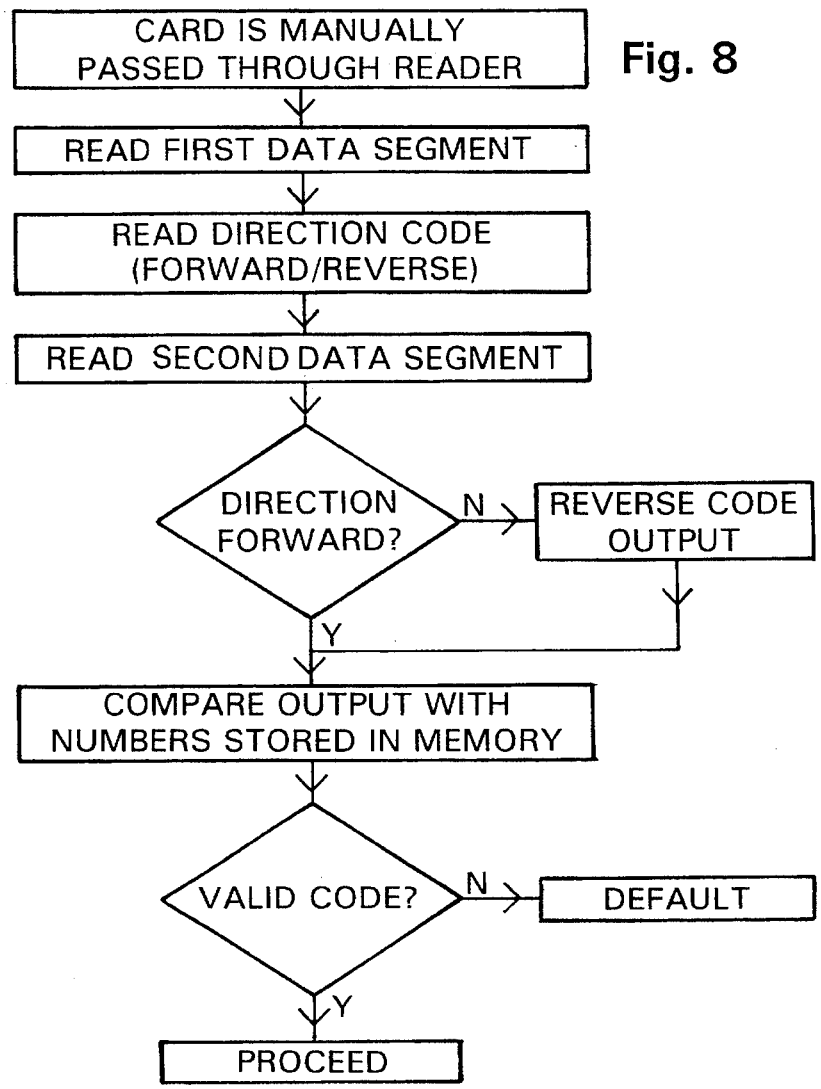
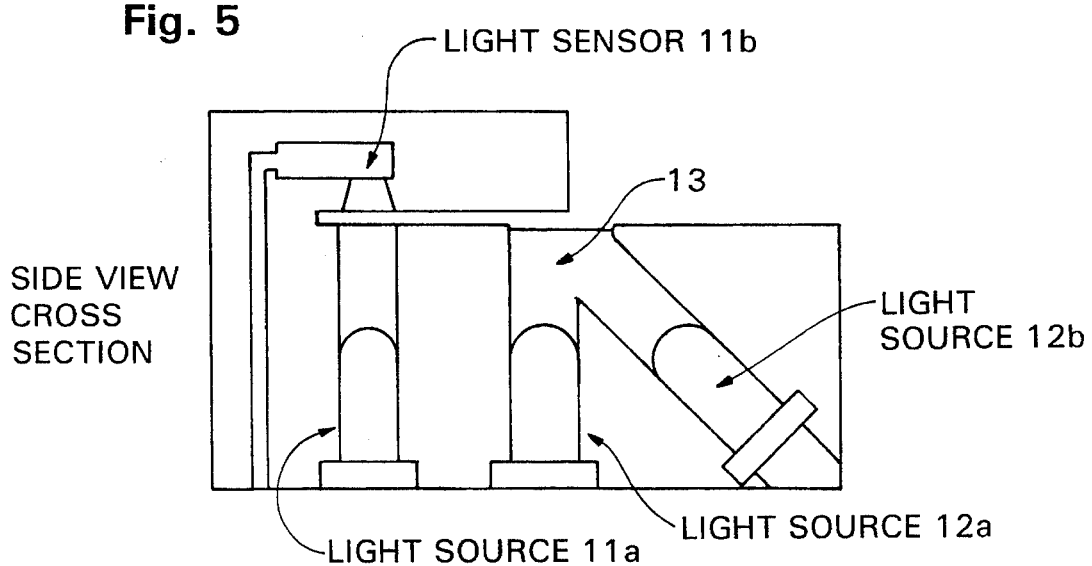

BAR-CODED CARD WITH CODING AND READING SYSTEM

FIELD OF THE INVENTION

This invention generally relates to a printed code identification system. More specifically, it relates to a coding system using a bar code type identifier which employs a unique system of coding information.

BACKGROUND OF THE INVENTION AND DESCRIPTION OF THE PRIOR ART

Machine-readable information presented in a printed bar-type coded format is used widely and for various purposes. One such area in which the present invention is particularly useful is in the field of advertising and product marketing; for example, coupon redemption which is a well-known system for advertising and selling retail merchandise. Typically, coupons are either distributed through the mail or printed in newspapers and other publications. The potential buyer then clips the coupon and presents it to the retailer for a discount on the item purchased. These types of coupons have the value of the coupon clearly displayed with regard to the discount that it provides on the related product.

Some types of coupons and vouchers, including lottery tickets, have used a secret coded identifier in order to conceal the value of the coupon until it is redeemed. This is important for security reasons. This type of system is described in U.S. Pat. No. 4,832,341, issued to Muller et al, on May 23, 1989. This patent discloses a system of distribution and redemption of lottery tickets using a bar-coded identifier in the form of a conventional UPC (Universal Product Code) bar code. U.S. Pat. No. 5,007,641, issued to Charles B. Seidman, on Apr. 16, 1991, discloses a bar-coded token, bearing machine readable codes. According to this patent, the tokens may actually be coupons, or product packaging containing the standard universal product code symbol. Neither of the above-mentioned patents describes a bar coding system, other than the Universal Product Code. There is no other more pertinent patent prior art of which the applicants are aware than that described above.

Prior art systems are inadequate, since any prize coupon promotional program using these systems would be too expensive to make the promotion program cost-effective. Typically, bar code readers are complicated and expensive pieces of equipment. Furthermore, the prior art readers also require greater expense because their sensitivity to light/dark distortion requires very accurate printing of the bar code on the coupon. This greatly increases the cost of producing the coupons.

There is, therefore, a need in the art for marketing and other advertising programs which utilize a printed consumer-carried element, such as a coupon, which contains a secret identifier that is very inexpensive to produce and easy to use. Also, in many other applications, such as sweepstake membership clubs, frequent buyer rewards, security systems inventory control and amusement games, there is a need for bar-type coded printed materials which are inexpensive and easy to use. Furthermore, there is a need for a bar-code reader that is both reliable and inexpensive to produce.

SUMMARY OF THE INVENTION

In order to overcome the deficiencies in the art described above, this invention has been devised. In its most general form, the invention relates to a bar-type coding system which has application to the various fields mentioned above where it is needed. The field of marketing and product advertising is an area in which the present invention provides great advantages; however, it should be understood that in describing the invention for this field, it is presented only to demonstrate the invention and is but one example of its use.

In but one application, the present invention provides a unique promotional system which utilizes a coupon having a novel bar coding system. With this system, coupons distributed to potential patrons are scanned at designated locations within a retail store or other point of purchase. The bar-coded coupons are used in conjunction with a special reader which announces or indicates to the patron a prize that he has won, which is indicated by the bar-coded identifier on his specific coupon. Thus, patrons may be drawn into a retail establishment in order to scan their coupons and determine their prize value. This provides additional traffic in the retail store and, thus, the potential of new and greater business.

There are inherent security risks with the above-described coupon/prize program, and the present high-security, inexpensive, easily-read bar coding system has been devised in order to meet this requirement. The bar coding system of the invention includes a unique code, which represents a series of dark and light stripes that may be easily decoded by a very inexpensive reader and with great reliability. With the bar coding system of the present invention, binary data is generated, similar to a normal UPC system, except that the information is encoded in a much different fashion as further described herein.

The bar code pattern includes the following segments: long light fields at each left and right end; a start bar at each end; right and left data fields, including multi-bit encoded stripes; and a three-bit asymmetric pattern (light, dark, light) in the middle that indicates the direction in which the pattern is moving past the read head.

The coding method of the segments is arranged from either end toward the middle of the pattern where the coding method reverses. Therefore, a coupon or card passed through the reader backward will initially be read by the controller the same as in the forward direction, except that the sequence of the output will be in reverse order. The centrally-located direction indicator senses the backward order, and the output sequence is reversed before it is finally processed. Thus, an extremely easy to read coding method has been devised which may be passed through a reader in either direction and yield the same data output.

With the encoding system of the present invention that will be more fully described, all of the dark stripes are read separately from the light stripes, and each group of light or dark stripes is read as pairs in succession. Only two widths of stripes need to be used and, hence, the read mechanism need only discriminate between wide and narrow. The binary conversion is determined by whether a pair of successive stripes is either wide/narrow, or narrow/wide. Using this unique encoding method, it has been found that the present system is relatively insensitive to reading speed, or light/dark distortion of the printed code.

A second aspect of the invention is the coupon or card reader. The unique bar-type encoding described above is read by a device which includes three main parts; a read head containing sensors; a controller; and an output device. The reader operates as follows: the read head, which contains the sensor for reading the bar code stripes, outputs a logic signal that is a representation of the bar code pattern.

This logic signal is transmitted to the controller that analyzes the received pattern to generate the numeric binary code it represents. The controller then compares this numeric code to codes stored in its memory to determine that a valid code exists and the prize it represents. Next, the controller transmits a signal to an output device which informs the user of the result. The output device may be a speech system that outputs pre-recorded messages, an LED array, or a display of incandescent indicators. Also, there may be multiple messages stored in the output device which are accessible by the controller.

Another unique feature of the reader is the shape of the card slot and location of the read head. The card slot defines an arcuate path bounded by inner and outer radius sidewalls. The read head is positioned along the inner radius wall at approximately the middle of the arc. Because of the shape of the card slot, an inserted card made from a material having a material with some resilience to bending is forced against the outer radius wall of the slot at the entry and exit point of the card, and against the read head at the middle of the inner arc. The result is to press the card against the read head and thereby minimize the distance between the read head and the printed card. This enhances both the reader's accuracy and reliability.

The read head contains two sets of LED/photodetector pairs. One pair functions as a card entry detector, and the other pair functions to read the stripes. The electronic system operates at a low power level until a card is passed over the read head, thereby blocking the LED light beam, and causing the system to come to full power. After the message is finished, or the output given, the system returns to a low power condition. Power may be further reduced by pulsing the slot detector LED. The detector pulsing is set to be "on" for less than 5% of the time. Thus, the "on" time of the card detector is vastly reduced and, hence, it allows for lower current operation. Because of the duty cycle power savings, peak brightness can be increased, allowing for more reliable card detection and still provide power savings.

It is therefore an object of the present invention to create a novel bar-type identifier encoding system that cannot be read with any prior art bar code reader.

It is a further object of the present invention to create a novel identifier code that can be inexpensively produced and very easily read.

It is yet a further object of the present invention to create an identifier coding and decoding system that is inexpensive to produce and easy to use.

It is another object of the present invention to create a bar-type printed identifier code reader which is highly reliable and inexpensive to operate. Other objects and advantages of the present invention will be readily apparent to those of ordinary skill in the art from the following drawings and description of the preferred embodiment.

BRIEF DESCRIPTION OF THE DRAWINGS

FIG. 1 shows the prize coupon of the present invention with the bar code type identifier printed thereon.

FIG. 2 is a diagram showing binary numeric conversion of the bar type encoding of the present invention.

FIG. 5 is a side-sectional view of the card-reader shown in FIG. 4.

FIG. 8 is a flow chart showing code processing and validation.

DESCRIPTION OF THE PREFERRED EMBODIMENT

FIG. 1 shows a typical coupon in the form of a simple card 21, including an identifier portion of stripes with secret encrypted information presented in a bar code format. The coupon may be distributed to store patrons as a separate card or may be printed in publications, such as newspapers and magazines, which may be clipped out. As further described herein, the present invention is particularly insensitive to light/dark distortion which may incur with inexpensive printing techniques and paper stock used in mass publications, such as newsprint.

Referring now to FIG. 2, a small section of encoded identifier is shown in order to more fully illustrate the encoding system of the present invention. In this illustration, four stripes A, B, C and D are represented in two different configurations in order to demonstrate the encoding principle. Each pair may only have two possibilities; either wide/narrow, or narrow/wide. The wide/narrow combination represents the binary bit "1", and the narrow/wide pair represents the binary bit "0". All of the dark stripes are read separately from the light stripes, and each group of light or dark stripes is read as pairs in succession. Since only two widths of stripes are used, the read mechanism need only discriminate between wide and narrow.

Figure 3:
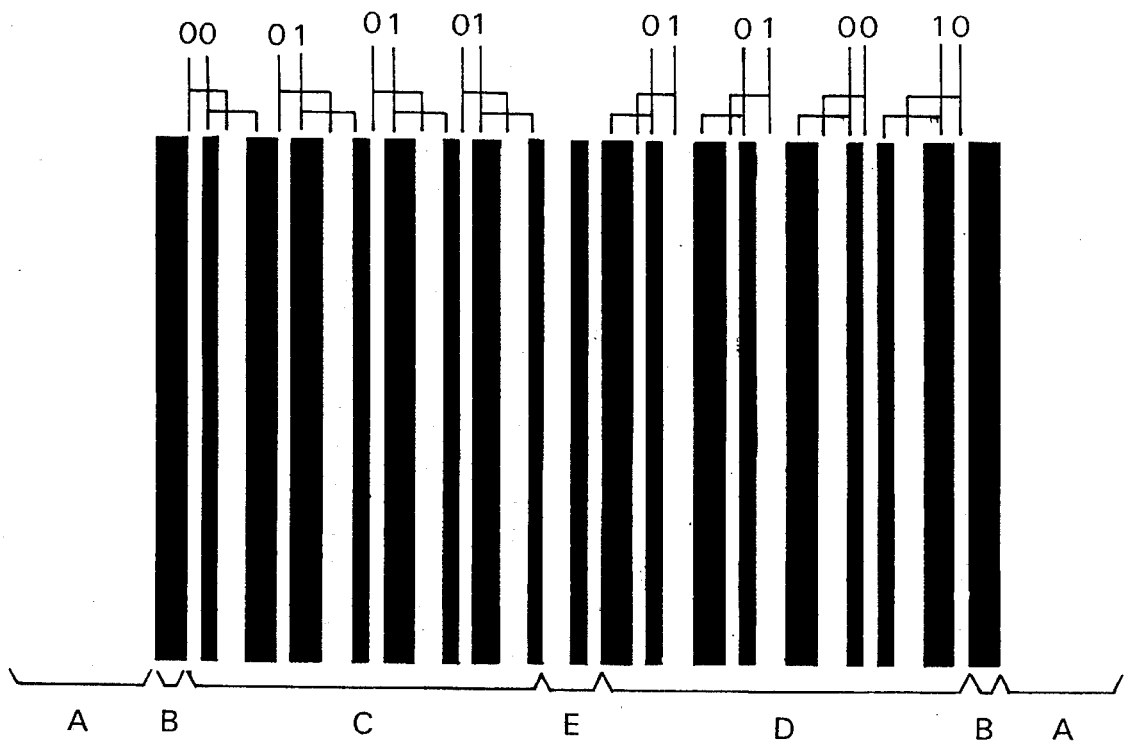
FIG. 3 is a full coding pattern on a typical prize coupon.

Referring now FIG. 3, a full pattern which appears on a typical prize coupon is shown. A full pattern includes five sections: a leading light area "A"; a (right and left) first-mark dark stripe "B"; a left-side segment, including eight bits of encoded data "C"; a right-side segment, including eight bits of encoded data "D; and direction indicator section "E". At the top of this figure, dark and light bit pairs have been organized to show their numeric binary representation. The data pattern is generally divided into two segments, each segment containing an eight-bit binary number; however, it should be understood that if so desired, a greater data pattern can generate a longer number string, and a shorter data pattern can generate a shorter number string.

The pattern may be read in either direction and yield the same result using the following system. The pattern contains wide dark stripes B at either end. This is followed by eight bits of encoded information with the wide/narrow combination pair representing the binary bit "1". After four bit pairs have been counted, the encoding method reverses. That is, wide/narrow now represents the bit pair "0" and vice versa. Therefore, the coupon can be passed by the read head in either direction and yield the same result, but in reverse order. In the very center of the pattern is a pair of wide and narrow light spaces which are read to indicate the direction (forward or reverse) in which the coupon has been passed by the read head. A coupon inserted in the reverse direction and whose output is presented in reverse order is re-ordered when signalled by the direction indicator before the data is further processed by the controller.

Figure 4:
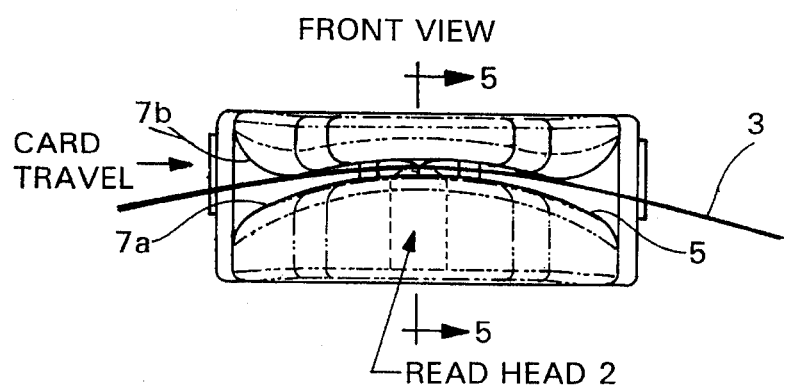
FIG. 4 is a front view of the card-reader.

Referring now to FIG. 4, the card reader is shown with a card 3 positioned in the arcuate card slot 5. As shown in this figure, the card is being inserted from left to right. The card slot has inner and outer radius sidewalls 7a and 7b with the read head positioned at the bottom along the inner radius wall of the slot in approximately the middle of the arc. Thus, as each card is inserted, the inherent resilience of the card material resists the curve of the slot and is thereby forced against the outer radius wall 7b at the entry and exit point of the card slot and against the read head at the middle of the slot. This holds the card against the slot wall close to the read head which thus maintains a consistent and minimal distance between the read head and the coded card as it passes through the slot. This results in a more consistent and reliable output from the read head, which is a critical feature of the invention.

Referring now to FIG. 5, a side-sectional view of the read head is shown depicting the relationship between the light sensors and the light sources. Along the inner radius sidewall midway along the slot, a read port 13 is directed upward at the coupon and is open to the light sensor 12a and LED light source 12b which both face the port with an included angle between them. It will be readily understood from this illustration that the dark or light stripe on a card passed over the read head port will either reflect or disburse the light from the light source onto the sensor. Light source/sensor pair 11a and 11b detect a presence of the card as it is inserted into the slot.

Figure 6:
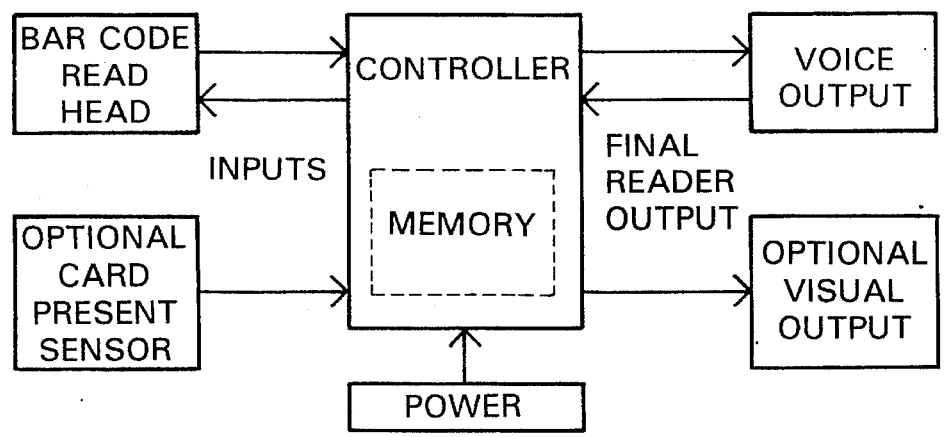
FIG. 6 is a block diagram showing various operational components of the card-reader.

Referring now to FIG. 6, a block diagram of the operational components of the coupon reader is shown. The main function of the controller is to receive the logic signal from the read head and to perform the binary conversion. In the present system, the binary bit of a "0" or "1" consists of a pair of dark (wide or narrow) stripes to represent one binary bit, interleaved with a pair of light (wide or narrow) stripes that represent another bit. By this pairing of successive dark or light stripes, the read sensor needs only to distinguish whether the same color pattern pair of light or dark is wide/narrow, or narrow/wide. The sensor then can re-reference itself for each pair. Therefore, dark/light distortion in the sensor is compensated out because if there is a print distortion, both widths of a same-color will be distorted equally. Hence, the code may be inexpensively printed since the reading system can tolerate a high degree of light/dark distortion. This design is therefore relatively insensitive to speed changes as the coded card passes the read head and allows the wide/narrow ratio to be relatively small allowing for more data to be compressed into a fixed space.

The controller deciphers the bar-type code and recognizes the binary pattern by comparing the width of a pair of light or dark, wide/narrow stripes with a pair of counters that store the two widths. One pair of counters is designated for the reflected output of the light stripes, and a second pair of counters is designated for the output corresponding to the dark stripes. The values of a given designation (light or dark) are then compared to determine which is greater. After checking a two-bit set of four stripes and loading the two bits into a register, the four counters are cleared and the next four stripes are measured and so on.

The three-bit direction stripes in the middle of the pattern indicate whether the card has passed in a forward or reverse direction. In the case where reverse direction is detected, the order of the complete numeric output is reversed after it is assembled. The complete properly ordered code is then further processed by the controller.

Figure 7:
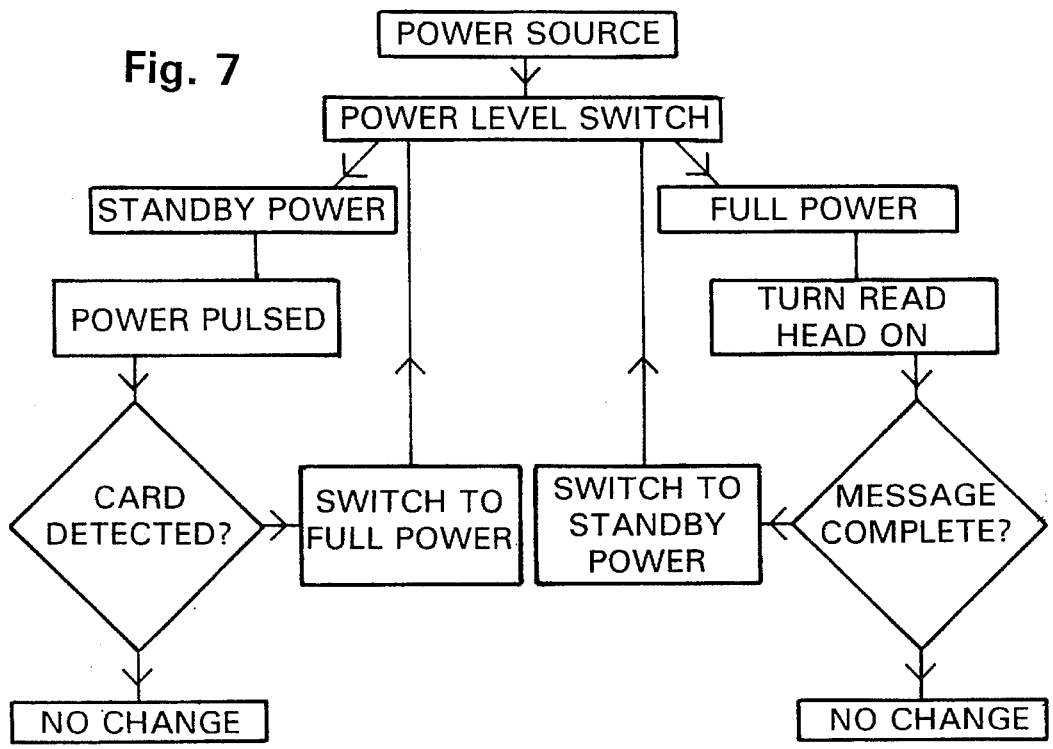
FIG. 7 is a flow chart showing the power regulation system.

Once the completed binary code has been determined, the controller compares this code with other codes stored in its memory to first determine that it is a valid code, then secondly to indicate the value that it represents. The controller then transmits a signal to the appropriate output device which relates to the coupon code. The output device may be an audio and/or visual output. For example, the output device may be a speech system that outputs prerecorded messages. In that case, there are multiple messages stored in the output device which are addressable by the controller. The flow chart of FIG. 7 illustrates the above-described power regulation, and FIG. 8 is a flow chart which illustrates the above-described data processing.

Another function of the controller is to receive the output from the card entry detector of the slot reader and to turn on the opto pair that reads the bar code. As previously described herein, in order to save power, the controller will then turn off the opto pair that reads the bar code after the bar code has been read.

The present invention, thus, achieves the objectives of providing a level of high security for a prize coupon identifier in which both the coupon and the reader are very inexpensive and, thus, lend themselves to use with the advertising and marketing field described above. A major advantage is that it can easily be battery-powered. Its other advantages and benefits over prior art bar-coding systems also makes it desirable for use in many other areas, including sweepstake membership clubs, frequent buyer rewards, security systems, inventory control, and amusement games.

It should be understood that the above description discloses specific embodiments of the present invention and are for purposes of illustration only. There may be other modifications and changes obvious to those of ordinary skill in the art which fall within the scope of the present invention which should be limited only by the following claims and their legal equivalents.

What is claimed is:

1. A bar-type coding system, comprising:

a plurality of spaced vertical stripes printed on a contrasting field, such that they form a pattern appearing as a sequence of alternating dark and light stripes, said stripes being of only two possible widths, wide or narrow;

said pattern representing data coded according to a decoding method in which two successive light or two successive dark stripes being discrete pairs of different width and the comparison of two successive light or two successive dark stripes represents one possible binary signal if the sequence is wide/narrow and represents the other possible binary signal if the sequence is narrow/wide, wherein said pattern is divided into right-side and left-side segments, and said decoding method applied to the left-side segment being the opposite logic of the decoding method applied to the right-side segment without altering the pattern coding.

2. The bar-type coding system of claim 1, wherein said pattern further includes read direction coding in the middle of said pattern between said right-side and said left-side segments, said direction coding indicating one of two possible read directions, forward or reverse.

3. The bar-type coding system of claim 2, further including a reader having a reader path and a read head for decoding said pattern and providing a reader output by applying said decoding method, said pattern printed on a card and moved along the reader path past the read head which detects the widths of said stripes.

4. The bar-type coding system and reader of claim 3, wherein said reader is responsive to said direction coding, whereby the complete output of said reader is reversed in order if the direction coding indicates that the pattern was read in the reverse direction, and thus the final reader output is the same when the full pattern is read in either direction.

5. The bar-type coding system and reader of claim 4, wherein said system operates at two power levels, a low-power standby level and a full-power read level, said reader operating at said standby power level until the presence of the card is detected passing into said reader path, and then operated at said full-power level only until the output message is completed.

6. The bar-type coding system and reader of claim 5, wherein the passage of a coded card is detected by said read head, comprising two pairs of LED/photosensors, whereby one pair detects the presence of the card and one pair reads the stripes.

7. The bar-type coding system and reader of claim 6, wherein the electrical power supply to said LED/photosensor card presence detector pair is pulsed to reduce power consumption.

8. The bar-type coding system and reader of claim 7, wherein said card is a coupon which is manually moved through said reader.

9. The bar-type coding system and reader of claim 8, further including a controller which compares a numeric equivalent of a logic signal output of said reader to numbers stored in said controller's memory to determine that a valid output exists.

10. The bar-type coding system and reader of claim 4, further including an output device connected to said controller.

11. The bar-type coding system and reader of claim 10, wherein said output device is a speech system that outputs pre-recorded audio messages.

12. The bar-type coding system and reader of claim 3, wherein said reader path is defined by a card slot having an arcuate shape described by opposing arcuate slot walls.

13. The bar-type coding system and reader of claim 12, further described in that the walls of said arcuate card slot define inner and outer radiuses of an arc with said read head positioned along the wall of the inner radius at approximately midway along said arc of said slot.

14. A bar-type coding system, comprising:

a plurality of spaced vertical stripes printed on a contrasting field, such that they form a pattern appearing as a sequence of alternating dark and light stripes, said stripes being of only two possible widths, wide or narrow;

said pattern representing data coded according to a decoding method in which the comparison of two successive light or two successive dark stripes represents one possible binary output if the sequence is wide/narrow and represents the other possible binary output if the sequence is narrow/wide;

wherein said pattern is divided into right-side and left-side segments, said coding method applied to the left-side segment yielding the opposite result of the coding method applied to the right-side segment;

wherein said pattern further includes read direction coding in the middle of said pattern between said right-side and said left-side segments, said direction coding indicating one of two possible read directions, forward or reverse;

further including a reader having a reader path and a read head for decoding said pattern and providing a reader output by applying said decoding method, said pattern printed on a card and moved along the reader path past the read head which detects the widths of said stripes;

wherein said reader is responsive to said direction coding, whereby the complete output of said reader is reversed in order if the direction coding indicates that the pattern was read in the reverse direction, and thus the final reader output is the same when the full pattern is read in either direction;

wherein said system operates at two power levels, a low-power standby level and a full-power read level, said reader operating at said standby power level until the presence of the card is detected passing into said reader path, and then operated at said full-power level only until the output message is completed;

wherein the passage of a coded card is detected by said read head, comprising two pairs of LED/photosensors, whereby one pair detects the presence of the card and one pair reads the stripes;

wherein the electrical power supply to said LED/photosensor card presence detector pair is pulsed to reduce the average power consumption;

wherein said card is a coupon which is manually moved through said reader;

further including a controller which compares the numeric equivalent of the logic signal output of said reader to numbers stored in its memory to determine that a valid output exists; and further including an output device connected to said controller which receives a signal from said controller and communicates a message to the user.

* * * * *